US008055624B2

(12) United States Patent
Cannon et al.

(10) Patent No.: US 8,055,624 B2
(45) Date of Patent: Nov. 8, 2011

(54) ON-SITE RECLAMATION OF OFF-SITE COPY STORAGE VOLUMES USING MULTIPLE, PARALLEL PROCESSES

(75) Inventors: David M. Cannon, Tucson, AZ (US); Yu-Mei U. Hsiao, Tucson, AZ (US); Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/008,393

(22) Filed: Dec. 9, 2004

(65) Prior Publication Data

US 2006/0129508 A1 Jun. 15, 2006

(51) Int. Cl.
*G06F 7/00* (2006.01)
*G06F 17/00* (2006.01)

(52) U.S. Cl. .......................... 707/644; 707/662; 711/162

(58) Field of Classification Search ................ 707/1–10, 707/200–204, 644, 662, 999.204
See application file for complete search history.

(56) References Cited

U.S. PATENT DOCUMENTS

| | | | | |
|---|---|---|---|---|
| 5,604,862 A * | 2/1997 | Midgely et al. | ................ | 714/6 |
| 5,608,865 A * | 3/1997 | Midgely et al. | ................ | 714/1 |
| 5,673,382 A * | 9/1997 | Cannon et al. | ................ | 714/6 |
| 6,226,651 B1 * | 5/2001 | Masuda et al. | ................ | 707/202 |
| 6,389,460 B1 * | 5/2002 | Stewart et al. | ................ | 709/217 |
| 6,769,072 B1 * | 7/2004 | Kawamura et al. | ................ | 714/5 |

OTHER PUBLICATIONS

Tivoli Storage Manager for AIX, Administrator's Guide, version 5, release 1, Mar. 2002.*

* cited by examiner

*Primary Examiner* — Shew-Fen Lin
(74) *Attorney, Agent, or Firm* — Kunzler Needham Massey & Thorpe

(57) ABSTRACT

An agent installed on a server reclaims one or more reclaimable off-site copy storage volumes and one or more reclaimable on-site copy storage volumes. To this end, the agent identifies each reclaimable off-site copy storage volume, runs a plurality of threads to collectively copy each data object of the identified reclaimable off-site copy storage volume(s) that is stored within one or more primary storage volumes to one or more one on-site target copy storage volumes, identifies each reclaimable on-site copy storage volume, and runs the plurality of threads to collectively transfer each data object of the identified reclaimable on-site copy storage volume(s) to the on-site copy target copy storage volume(s).

17 Claims, 9 Drawing Sheets

| STAGES | FIRST THREAD | SECOND THREAD | THIRD THREAD |
|---|---|---|---|
| S122 | 92 95 99 | 92 95 99 | 92 95 99 |
| S126 | 92 | 95 | 99 |
| S128 | 61, 63 → 83 | 62, 64 → 85 | 68, 69 → 87 |
| S130 | 72; →74; 78 | →72; 74; 78 | 72; 74; →78 |
| S124 | NONE | NONE | NONE |
| S144 | 72 | 74 | 78 |
| S146/S148 | 72 → 83 | 74 → 85 | 78 → 87 |
| S142 | NONE | NONE | NONE |

FIG. 7

| STAGES | FIRST THREAD | SECOND THREAD | THIRD THREAD |
|---|---|---|---|
| S152 |  82 84 89 |  82 84 89 |  82 84 89 |
| S156 |  82 |  84 |  89 |
| S158 |  82 → 83 |  84 → 85 |  89 → 87 |
| S154 | NONE | NONE | NONE |

ON-SITE RECLAMATION OF OFF-SITE COPY STORAGE VOLUMES USING MULTIPLE, PARALLEL PROCESSES

FIELD OF INVENTION

The present invention generally relates to storage management within data processing systems. The present invention specifically relates to on-site reclamation of data objects within a data processing system.

BACKGROUND OF THE INVENTION

A storage-management server provides a repository for computer information that is backed up, archived or migrated from client nodes in a computer network. Specifically, the storage-management server stores data objects (e.g., client files) in one or more storage pools and uses its own database for tracking information about the stored data objects. In particular, data objects stored within a copy storage volume on a removable storage media (e.g., a tape media) are protected at an off-site location whereby, if an on-site disaster occurs, data objects can be recovered from an off-site copy storage volume by retrieving the removable storage media from the off-site location and accessing the data objects within the off-site copy storage volume by the original storage-management server or a new storage-management server.

In managing the off-site copy storage volumes, the storage-management server periodically determines which off-site copy storage volumes are reclaimable in accordance with a policy of the storage-management server. For such reclaimable off-site copy storage volumes, the storage-management server typically coordinates the reclamation of the data objects stored within the off-site storage volumes to thereby consolidate the remaining off-site copy storage volumes to the highest degree possible whereby a successful reclamation and reuse of the remaining off-site copy volumes substantially improves the efficiency and performance of the storage-management server in executing a disaster recovery. A challenge for the computer industry is to enable on-site reclamation of a reclaimable off-site copy storage volume within a removable storage media that facilitates a reuse of the copy storage volume and a consolidation of the remaining copy storage volumes while eliminating any on-site risk to contents of the off-site copy storage volume.

SUMMARY OF THE INVENTION

The present invention provides new and unique multiple, parallel processes to perform an on-site reclamation of one or more reclaimable off-site copy storage volumes.

One form of the present invention is a computer usable medium tangibly embodying a program of machine-readable instructions executable by one or more processor(s) to perform operations to facilitate an on-site reclamation of the reclaimable copy storage volume(s). The operations include (1) identifying at least one reclaimable off-site copy storage volume; and (2) running a plurality of threads to collectively copy each data object of the at least one identified reclaimable off-site copy storage volume that is stored within at least one primary storage volume to at least one on-site target copy storage volume.

A second form of the present invention is a system employing one or more processors, and one or more memories for facilitating an on-site reclamation of the reclaimable copy storage volume(s). The instructions being executed for (1) identifying at least one reclaimable off-site copy storage volume; and (2) running a plurality of threads to collectively copy each data object of the at least one identified reclaimable off-site copy storage volume that is stored within at least one primary storage volume to at least one on-site target copy storage volume.

A third form of the present invention is a server for facilitating an on-site reclamation of the reclaimable copy storage volume(s). The server include (1) means for identifying at least one reclaimable off-site copy storage volume; and (2) means for running a plurality of threads to collectively copy each data object of the at least one identified reclaimable off-site copy storage volume that is stored within at least one primary storage volume to at least one on-site target copy storage volume.

The forgoing forms and other forms, objects, and aspects as well as features and advantages of the present invention will become further apparent from the following detailed description of various embodiments of the present invention, read in conjunction with the accompanying drawings. The detailed description and drawings are merely illustrative of the present invention, rather than limiting the scope of the present invention being defined by the appended claims and equivalents thereof.

BRIEF DESCRIPTION OF THE DRAWINGS

FIG. 7 illustrates an exemplary execution of the flowcharts illustrated in FIGS. 5 and 6;

DETAILED DESCRIPTION OF THE PRESENT INVENTION

Figure 1:
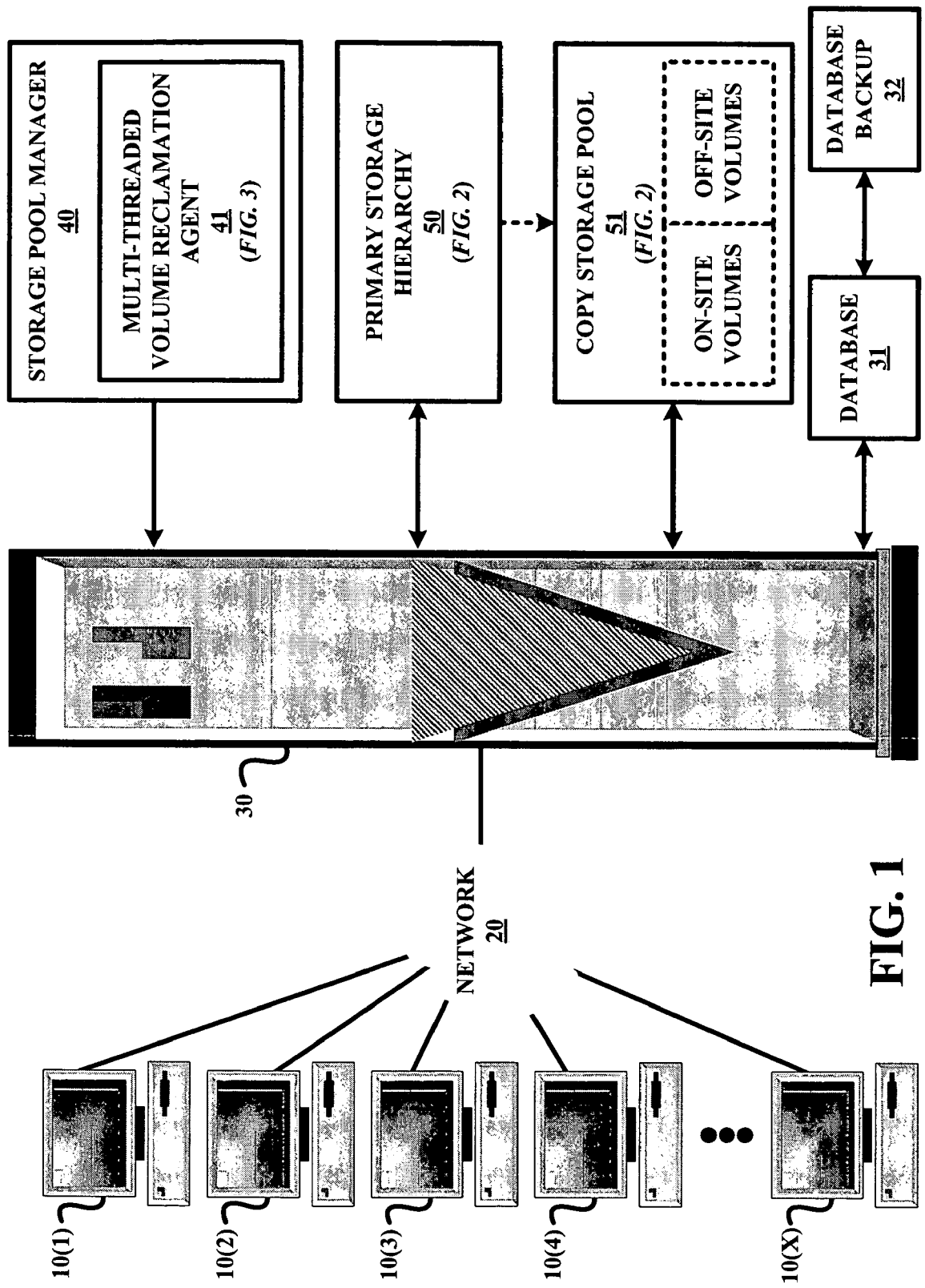
FIG. 1 illustrates an exemplary operational environment for data reclamation of off-site volumes using multiple, parallel processes in accordance with the present invention.

The present invention provides a new and unique data reclamation method involving multiple, parallel on-site reclamations of reclaimable off-site copy storage volumes. FIG. 1 illustrates an exemplary computer environment for practicing the present invention. Referring to FIG. 1, a storage-management server 30 is connected via a network 20 to an X number of clients 10(1)-10(X), where X≧1. Server 30 is further connected to a primary storage hierarchy 50 containing primary storage volumes stored within various storage media (e.g., DASD and tape media) located at an on-site location, and a copy storage pool 51 containing copy storage volumes stored within storage media (e.g., tape media)

located at the on-site location and copy storage volumes stored within storage media (e.g., tape media) located at an off-site location. Primary copies of data objects (e.g., client files) associated with clients 10(1)-10(X) are conventionally stored within the primary storage volumes of primary storage hierarchy 50, and secondary copies of the data objects are conventionally stored within the copy storage volumes of copy storage pool 51. Server 30 conventionally uses a database 31 and a database backup 32 whereby database 31 catalogs a location of each data object as stored within primary storage hierarchy 50 and copy storage pool 51.

A storage pool manager 40 of the present invention is installable on server 30. Manager 40 has a multi-threaded volume reclamation agent 41 that facilitates server 30 in executing multiple, parallel processes of on-site reclamations of reclaimable copy storage volumes of copy storage pool 51. Generally, manager 40 includes hardware, software and/or firmware configured to launch agent 41 into establishing Y number of multiple, parallel volume reclamations of reclaimable copy storage volumes of copy storage pool 51, where $Y \geq 2$. To this end, agent 41 includes hardware, software, and/or firmware configured to identify each reclaimable copy storage volume of copy storage pool 51, and to run Y number of threads for collectively copying the data objects of each identified reclaimable off-site copy storage volume of copy storage pool 51 to one or more target on-site copy storage volumes of copy storage pool 51, collectively transferring the data objects of each identified reclaimable on-site copy storage volume of copy storage pool 51 to the target on-site copy storage volume(s), and collectively updating database 31 with the locations of the data objects of reclaimed copy storage volume(s) within the target copy storage volume(s).

Figure 2:
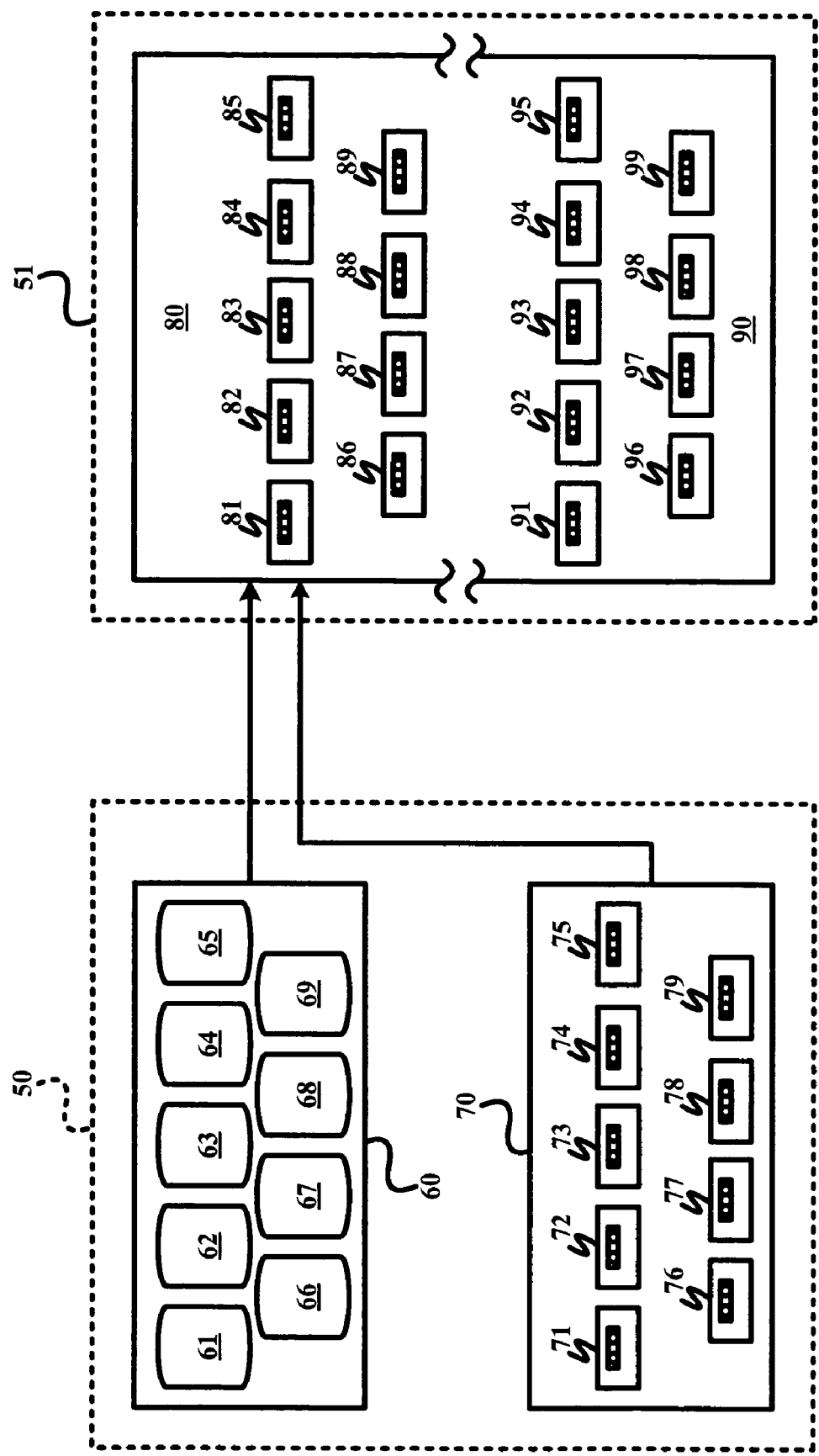
FIG. 2 illustrates an exemplary disaster recovery system within the operational environment illustrated in FIG. 1.
Figure 3:
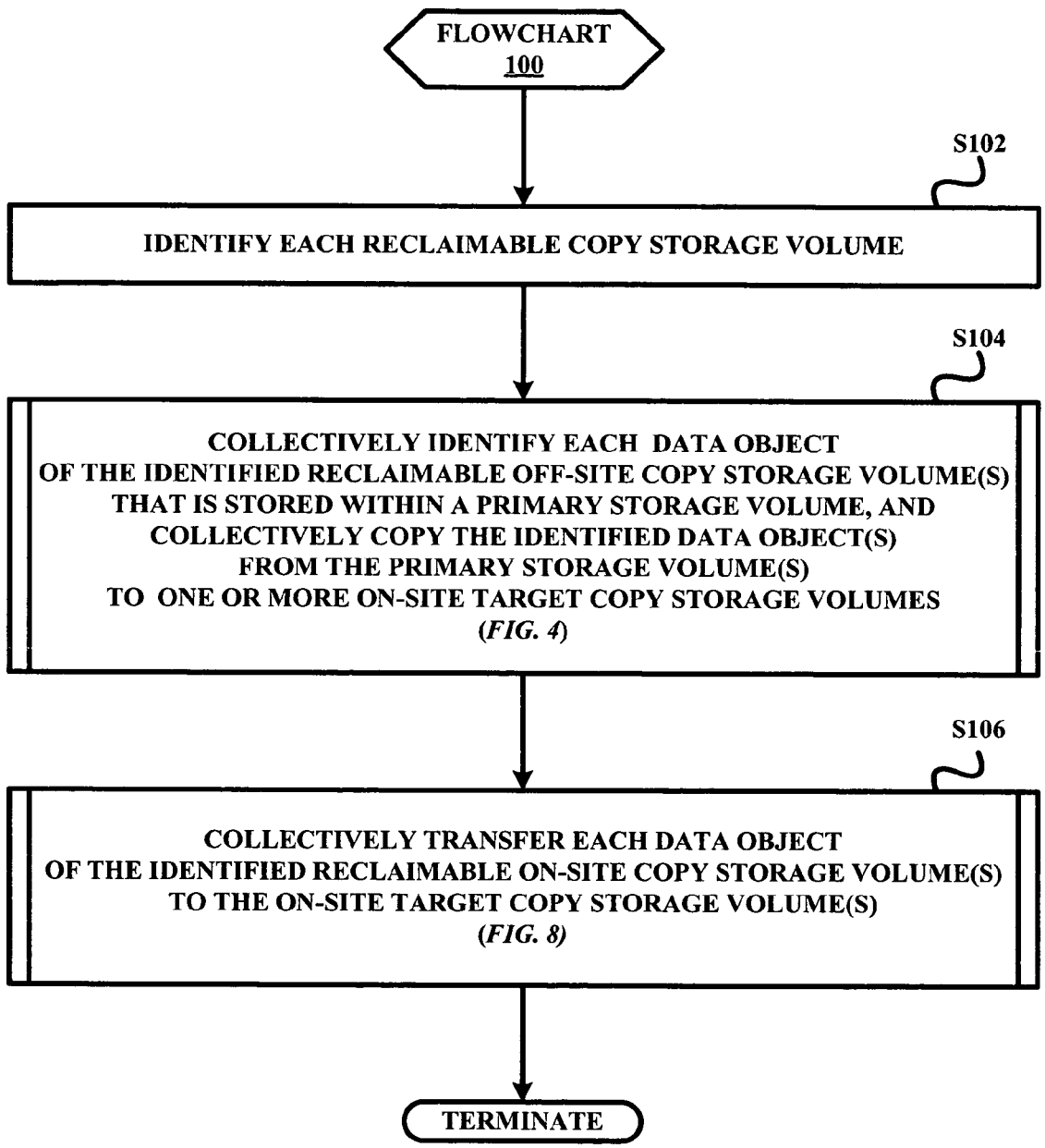
FIG. 3 illustrates a flowchart representative of one embodiment of an on-site reclamation method in accordance with the present invention.

Specifically, as illustrated in FIG. 3, agent 41 implements a flowchart 100 representative of an on-site reclamation method of the present invention. To facilitate an understanding of flowchart 100 and its embodiments as illustrated in FIGS. 4-9, FIG. 2 illustrates an exemplary disaster recovery system stemming from the computer environment illustrated in FIG. 1. Referring to FIG. 2, the exemplary disaster recovery system includes primary storage hierarchy 50 including a primary storage pool 60 having nine (9) random-access primary storage volumes 61-69, each of which facilitate server 30 (FIG. 1) in directly accessing a particular storage location of a data object as stored therein. Primary storage hierarchy 50 further includes a primary storage pool 70 having nine (9) sequential-access primary storage volumes 71-79, each of which requires server 30 to locate a particular data object therein by starting a sequential read or fast forwarding of the sequential-access primary storage volume from a beginning of the volume until server 30 finds the storage location of the data object. Copy storage pool 51 as shown includes an on-site segment 80 having nine (9) sequential-access copy storage volumes 81-89, and an off-site segment 90 having nine (9) sequential-access copy storage volumes 91-99.

From the following description of FIGS. 3-9 in the context of the exemplary system illustrated in FIG. 2, those having ordinary skill in the art will appreciate the wide ranging applications of the on-site reclamation method of the present invention to other disaster recovery systems.

Referring to FIGS. 2 and 3, agent 41 (FIG. 1) is launched by manager 40 (FIG. 1) to run Y number of threads where the Y number is statically or dynamically set within server 30 (FIG. 1).

Agent 41 is configured during a stage S102 of flowchart 100 to identify each reclaimable copy storage volume among copy storage volumes 81-89 and 91-99. In one embodiment of stage S102, one of the Y threads (e.g., a master thread) queries database 31 to build a list of each copy storage volume among copy storage volumes 81-89 and 91-99 deemed reclaimable via a conventional policy associated with server 30, and the remaining thread(s) of the Y threads obtain the listing of the identified reclaimable copy storage volumes. Those having ordinary skill in the art will appreciate that such a policy can be based on varied and numerous factors (e.g., number and size of data objects in a copy storage volume).

In practice, the manner by which the threads of agent 41 implement stage S102 is without limit. Therefore, the preceding description of the one embodiment of stage S102 is not a limitation as to the scope of stage S102.

Referring still to FIGS. 2 and 3, if there are any reclaimable off-site copy storage volumes among copy storage volumes 91-99 identified as such during stage S102, then the Y threads of agent 41 are configured during a stage S104 of flowchart 100 to collectively identify each data object of the identified reclaimable off-site copy storage volume(s) among copy storage volumes 91-99 that is stored within one of the primary storage volumes 61-69 and 71-79, and collectively copy the identified data object(s) from the primary storage volume(s) 61-69 and 71-79 to one or more on-site target copy storage volumes among copy storage volumes 81-89. Thereafter, if there are any reclaimable on-site copy storage volumes among copy storage volumes 81-89 identified as such during stage S102, then the Y threads of agent 41 are further configured during a stage S106 of flowchart 100 to collectively transfer the data object(s) of the identified reclaimable on-site copy storage volume(s) among copy storage volumes 81-89 to the on-site target copy storage volume(s) among copy storage volumes 81-89. In one embodiment, each thread is independently run whereby each thread can proceed to stage S106 upon completing stage S104 irrespective as to whether any other thread has completed stage S104. Those having ordinary skill in the art will appreciate the maximum parallelism advantage of this independent thread embodiment in collectively implementing stages S104 and S106.

In practice, the manner by which each thread of agent 41 implements stages S104 and S106 is without limit. Therefore, the following description of an embodiment of stage S104 (FIG. 4) and an embodiment of stage S106 (FIG. 8) are not limitations as to the scope of stages S104 and S106.

Figure 4:
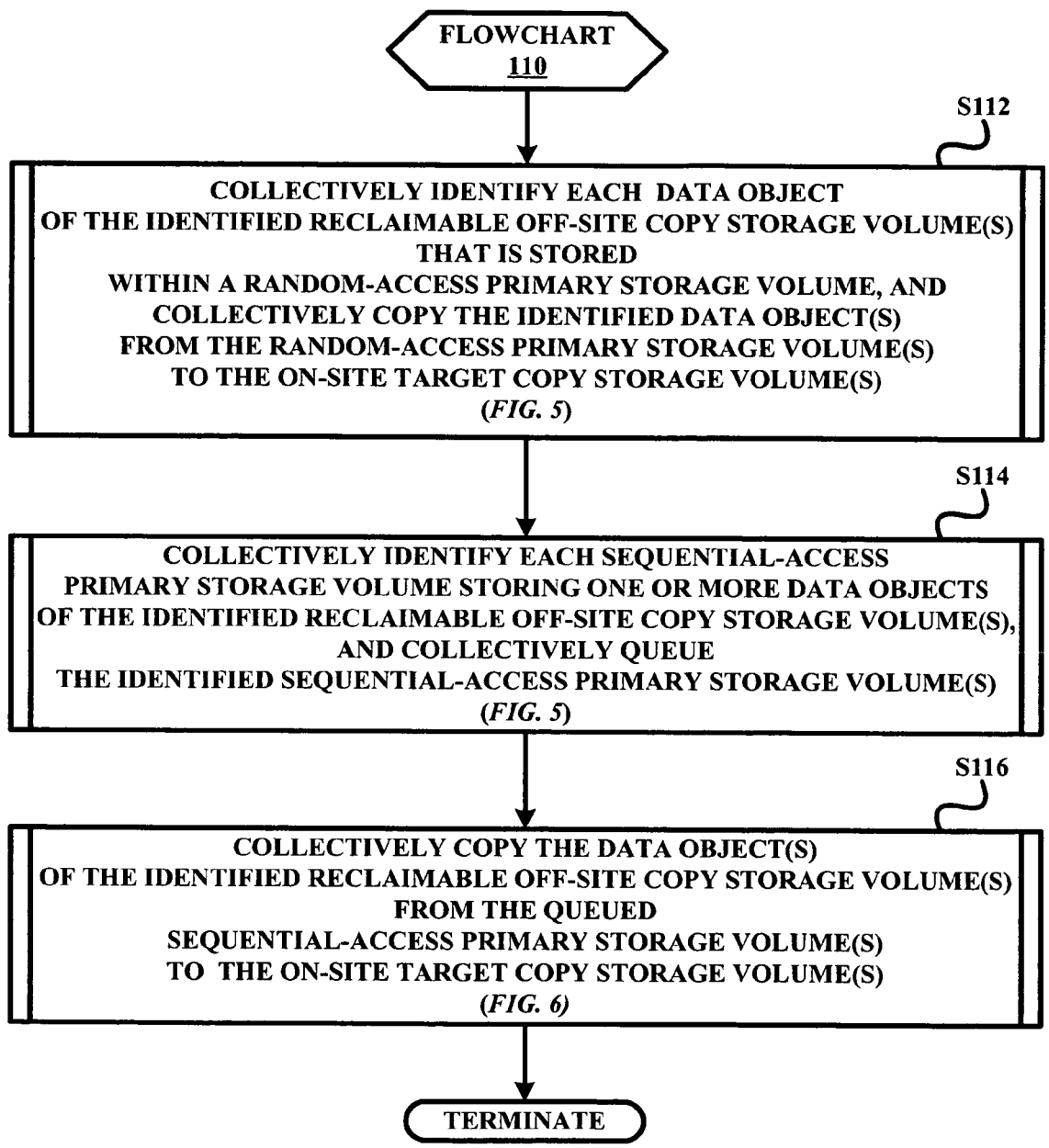
FIG. 4 illustrates a flowchart representative of one embodiment of a primary storage volume copy method in accordance with the present invention.

FIG. 4 illustrates a flowchart 110 as one embodiment of stage S104 (FIG. 3). Referring to FIGS. 2 and 4, if there are any reclaimable off-site copy storage volumes among copy storage volumes 91-99 identified as such during stage S102 (FIG. 3), then the Y threads of agent 41 are configured during a stage S112 of flowchart 110 to collectively identify each data object of the identified reclaimable off-site copy storage volume(s) among copy storage volumes 91-99 that is stored within one of the random-access primary storage volumes 61-69 as determined by a scan of database 31, and collectively copy the identified data object(s) from the random-access primary storage volume(s) 61-69 to the on-site target copy storage volume(s) among copy storage volumes 81-89. Additionally, the Y threads of agent 41 are configured during a stage S114 of flowchart 110 to collectively identify each sequential-access primary storage volumes among primary storage volumes 71-79 that stores one or more data objects of the identified reclaimable off-site copy storage volume(s) among copy storage volumes 91-99 as determined by a scan of database 31, and collectively queue the identified sequential-access primary storage volumes among primary storage volumes 71-79. Thereafter, the Y threads of agent 41 are configured during a stage S116 of flowchart 110 to collectively copy the data object(s) of the identified reclaimable off-site copy storage volume(s) among copy storage volumes 91-99 from the queued sequential-access primary storage volume(s) among primary storage volumes 71-79 to the on-site target copy storage volumes among copy storage volumes 81-89. In one embodiment, the Y threads of agent 41 share a common queue and each thread is independently run whereby each thread can proceed to stage S114 upon completing stage S112 irrespective as to whether any other thread has completed stage S112, and whereby each thread can proceed to stage S116 upon completing stage S114 irrespective as to whether any other thread has completed stage S114. Those having ordinary skill in the art will appreciate the maximum parallelism advantage of this common queue/independent thread embodiment in collectively implementing stages S112-S116.

In practice, the manner by which each thread of agent 41 implements stages S112-S116 is without limit. Therefore, the following description of an embodiment of stages S112 and S114 (FIG. 5) and an embodiment of stage S116 (FIG. 6) are not limitations as to the scope of stages S112-S116.

Figure 5:
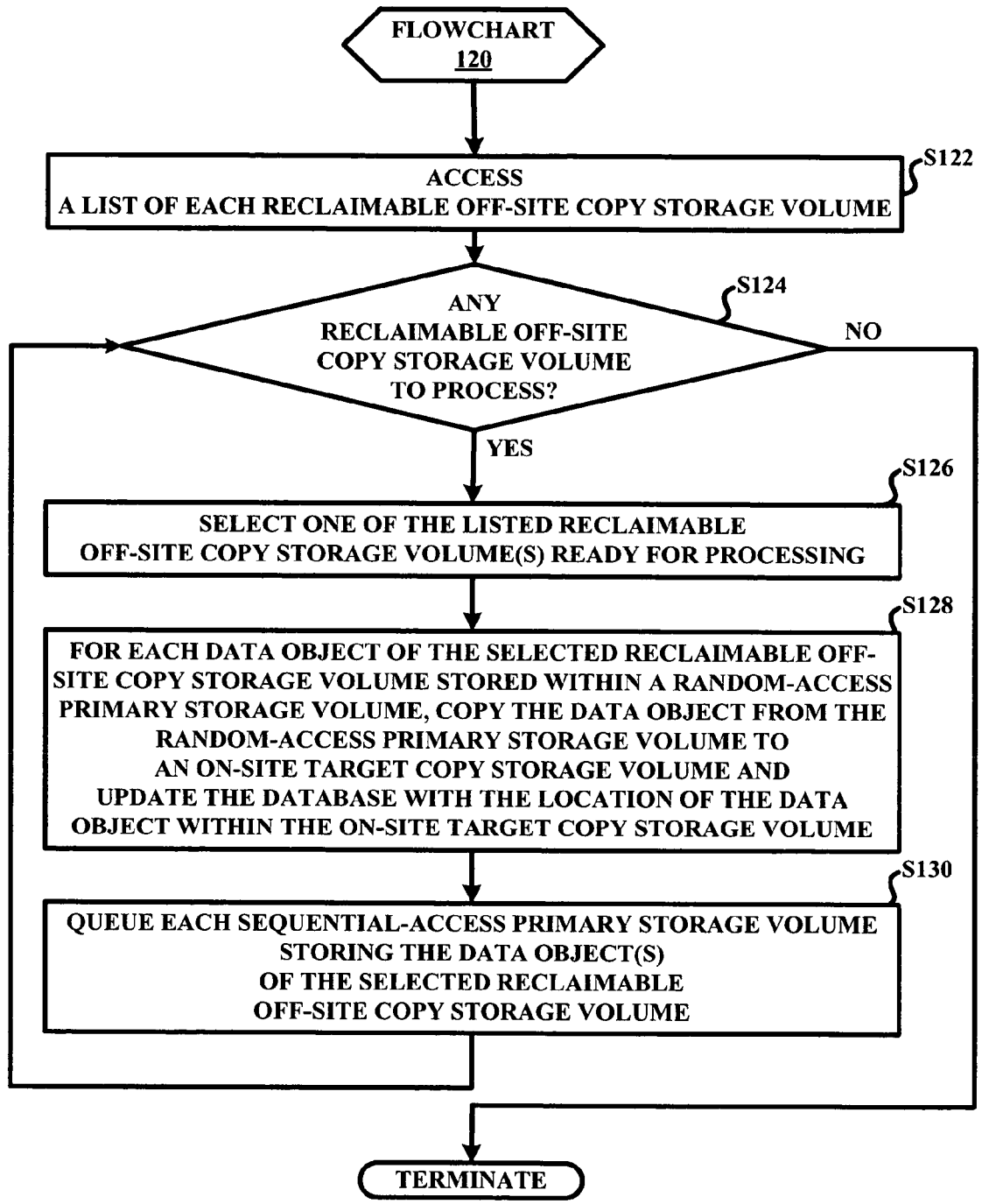
FIG. 5 illustrates a flowchart representative of one embodiment of an on-site random-access primary storage volume copy method in accordance with the present invention.

FIG. 5 illustrates a flowchart 120 embodying stages S112 and S114 (FIG. 4). Each thread of agent 41 independently implements flowchart 120 upon being set off by agent 41. Referring to FIGS. 2 and 5, each thread of agent 41 is configured during a stage S122 of flowchart 120 to access a list of each reclaimable off-site copy storage volume among copy storage volumes 91-99. In practice, the manner by which a thread of agent 41 implements stage S122 is without limit. In one embodiment of stage S122, each thread of agent 41 accesses a list resulting from a query of database 31 (FIG. 1) during a stage S102 of flowchart 100 (FIG. 3) for each off-site copy storage volume among copy storage volumes 91-99 deemed reclaimable in accordance with a conventional policy associated with server 30 (FIG. 1). FIG. 7 illustrates an example of stage S122 where off-site copy storage volumes 92, 95 and 99 are listed as being reclaimable in accordance with the conventional policy of server 30.

Referring again to FIGS. 2 and 5, each thread of agent 41 is configured during a stage S124 of flowchart 120 to terminate flowchart 120 if none of the off-site copy storage volumes among copy storage volumes 91-99 were deemed as being reclaimable in accordance with the conventional policy of server 30 or if all of the listed reclaimable off-site copy storage volumes among copy storage volumes 91-99 have been processed by one of the threads of agent 41 or are being processed by other threads of agent 41. If one or more of the off-site copy storage volumes among copy storage volumes 91-99 is listed as reclaimable and if at least one of the listed reclaimable off-site copy storage volumes among copy storage volumes 91-99 is ready for processing by a thread of agent 41, then each thread of agent 41 is configured during a stage S126 of flowchart 120 to select one of the listed reclaimable off-site copy storage volumes among copy storage volumes 91-99 that is ready for processing. FIG. 7 illustrates an example of stage S126 where listed reclaimable off-site copy storage volume 92 is selected by the first thread, listed reclaimable off-site copy storage volume 95 is selected by the second thread, and listed reclaimable off-site copy storage volume 99 is selected by the third thread.

Referring again to FIGS. 2 and 5, for each data object of the selected reclaimable off-site copy storage volume that is stored within one of the random-access primary storage volumes 61-69 as determined by a scan of database 31, each thread of agent 41 is configured during a stage S128 of flowchart 120 to copy the data object from the random-access primary storage volume to an on-site target copy storage volume among copy storage volumes 81-89, and to update database 31 with the location of the data object on the on-site target copy storage volume. FIG. 7 illustrates an example of stage S128 where (1) the first thread copies the data objects of off-site copy storage volume 92 as stored within random-access primary storage volumes 61 and 63 to an on-site target copy storage volume 83, (2) the second thread copies data objects of off-site copy storage volume 95 as stored within random-access primary storage volumes 62 and 64 to an on-site target copy storage volume 85, and (3) the third thread copies data objects of off-site copy storage volume 99 as stored within random-access primary storage volumes 68 and 69 to an on-site target copy storage volume 87. While this example shows each of the three (3) threads accessing different random-access primary storage volumes during stage S128, those having ordinary skill in the art will appreciate that is possible, if not likely, that a practical implementation of the present invention will result in one or more random-access primary storage volumes being accessed by two or more threads during stage S128, such as, for example, the first and third thread of FIG. 7 coping data objects from random-access primary storage volume 61 in response to volume 61 storing data objects stored within reclaimable off-site copy storage volumes 92 and 99.

Referring again to FIGS. 2 and 5, each thread of agent 41 is configured during a stage S130 of flowchart 120 to queue each sequential-access primary storage volume among primary storage volumes 71-79 storing one or more data objects of the identified reclaimable off-site copy storage volumes among copy storage volumes 91-99 as determined by a scan of database 31. FIG. 7 illustrates an example of stage S130 wherein, in sequential order, (1) the second thread queues primary storage volume 72 in view of the fact that primary storage volume 72 stores data objects from off-site copy storage volume 95, (2) the first thread queues primary storage volume 74 in view of the fact that primary storage volume 74 stores data objects from off-site copy storage volume 92, and (3) the third thread queues primary storage volume 78 in view of the fact that primary storage volume 78 stores data objects from off-site copy storage volume 99.

Referring again to FIGS. 2 and 5, a thread of agent 41 will return to stage S124 upon completing stage S130 to thereby terminate flowchart 120 if there are no more listed reclaimable off-site copy storage volumes among copy storage volumes 91-99, or if all of the remaining listed reclaimable off-site copy storage volumes among copy storage volumes 91-99 have been processed by one of the threads of agent 41 or are being processed by other threads of agent 41. Otherwise, the thread will re-implement stages S126-S130. FIG. 7 illustrates an example where all three threads terminate flowchart 120 upon returning to stage S124 in view of the fact that there are no more listed reclaimable off-site copy storage volumes among copy storage volumes 91-99.

Figure 6:
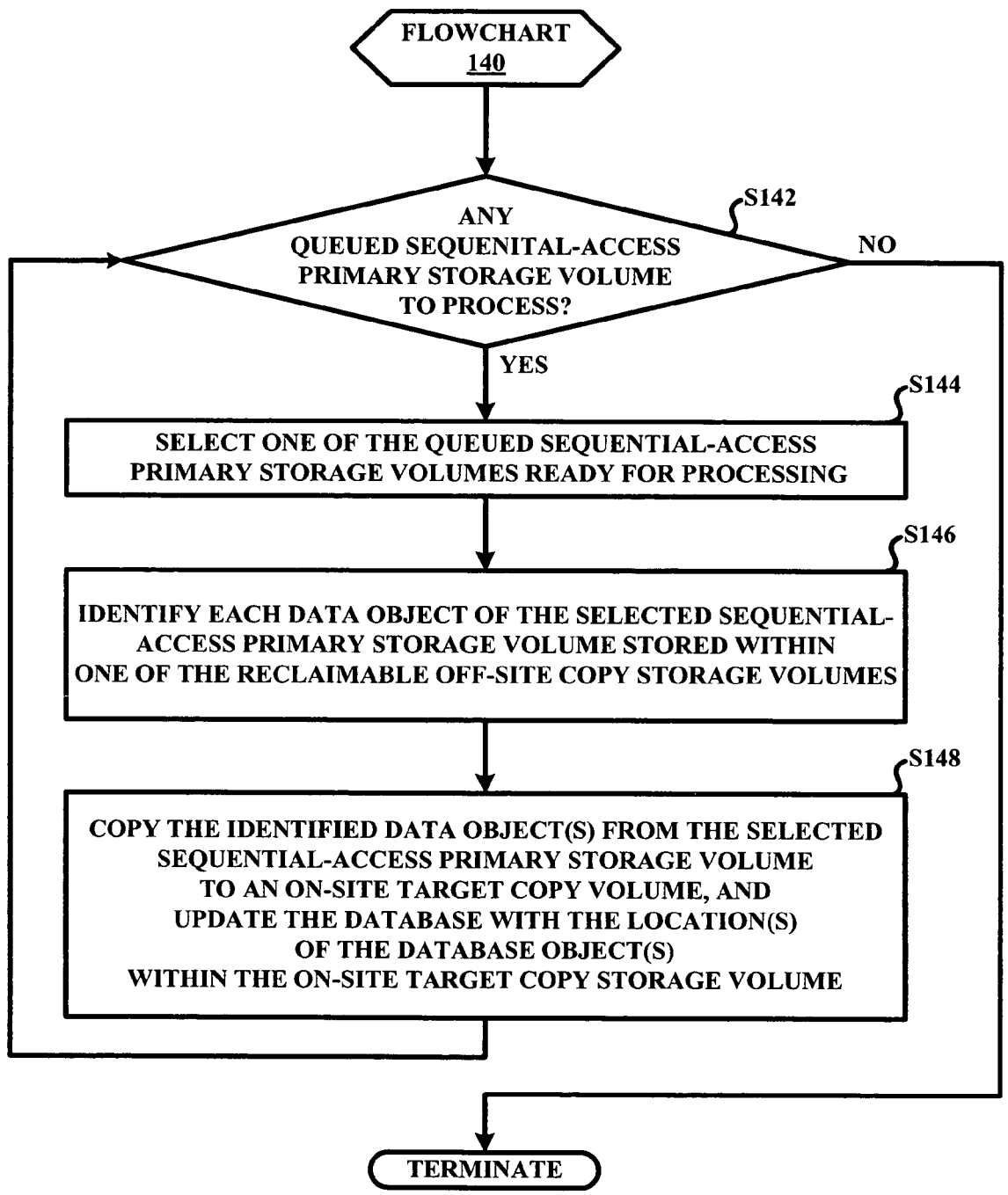
FIG. 6 illustrates a flowchart representative of one embodiment of an on-site sequential-access primary storage volume copy method in accordance with the present invention.

FIG. 6 illustrates a flowchart 140 as one embodiment of stage S116 (FIG. 4). Each thread of agent 41 independently implements flowchart 140 upon completing flowchart 120 (FIG. 5). Referring to FIGS. 2 and 6, each thread of agent 41 is configured during a stage S142 of flowchart 140 to terminate flowchart 140 if none of the sequential-access primary storage volumes among primary storage volumes 71-79 were queued during stage S130 (FIG. 5) or if the queued sequential-access primary storage volume(s) among primary storage volumes 71-79 have been processed by one of the threads of agent 41 or are being processed by other threads of agent 41. If one or more sequential-access primary storage volumes among primary storage volumes 71-79 are queued and if at least one queued sequential-access primary storage volume among primary storage volumes 71-79 is ready for processing by a thread of agent 41, then each thread of agent 41 is configured during a stage S144 of flowchart 140 to select one of the queued sequential-access primary storage volumes among primary storage volumes 71-79. FIG. 7 illustrates an example of stage S144 wherein the first thread selects queued sequential-access primary storage volume 72, the second thread selects queued sequential-access primary storage volume 74, and the third thread selects queued sequential-access primary storage volume 78.

Referring again to FIGS. 2 and 6, each thread of agent 41 is configured during a stage S146 of flowchart 140 to identify each data object stored within the selected queued sequential-access storage volume that is stored within one of the reclaimable off-site copy storage volumes among copy storage volumes 91-99 as determined by a scan of database 31. Each thread of agent 41 is further configured during a stage S148 of flowchart 140 to copy the identified data objects from the selected queued sequential-access primary storage volume to the on-site target copy storage volume among storage volumes 81-89. FIG. 7 illustrates an example of stages S146 and S148 wherein (1) the first thread copies each data object of the selected sequential-access primary storage volume 72 that has been identified as being stored within reclaimable off-site copy storage volume 95 to on-site target copy storage volume 83, (2) the second thread copies each data object of the selected sequential-access primary storage volume 74 that has been identified as being stored within reclaimable off-site copy storage volume 92 to on-site target copy storage volume 85, and (3) the third thread copies each data object of the selected sequential-access primary storage volume 78 that has been identified as being stored within reclaimable off-site copy storage volume 99 to on-site target copy storage volume 87. For this example, each queued sequential-access primary storage volume contains data objects that are stored on the same reclaimable off-site copy storage volume. However, those having ordinary skill in the art will appreciate that it is possible, if not likely, that a practical implementation of the present invention will result in a queued sequential-access primary storage volume containing data objects that are stored on two or more reclaimable off-site copy storage volumes whereby a thread selecting such a queued sequential-access primary storage volume will copy the data objects to the same on-site copy storage volume.

Referring again to FIGS. 2 and 6, a thread of agent 41 will return to stage S142 upon completing stage S148 to thereby terminate flowchart 140 if there are no more queued sequential-access primary storage volumes among primary storage volumes 71-79, or if all of the queued sequential-access primary storage volumes among primary storage volumes 71-79 have been processed by one of the threads of agent 41 or are being processed by other threads of agent 41. Otherwise, the thread will re-implement stages S144-S148. FIG. 7 illustrates an example where all three threads terminate flowchart 140 upon returning to stage S142 in view of the fact that there are no more queued sequential-access primary storage volumes among primary storage volumes 71-79.

Figure 8:
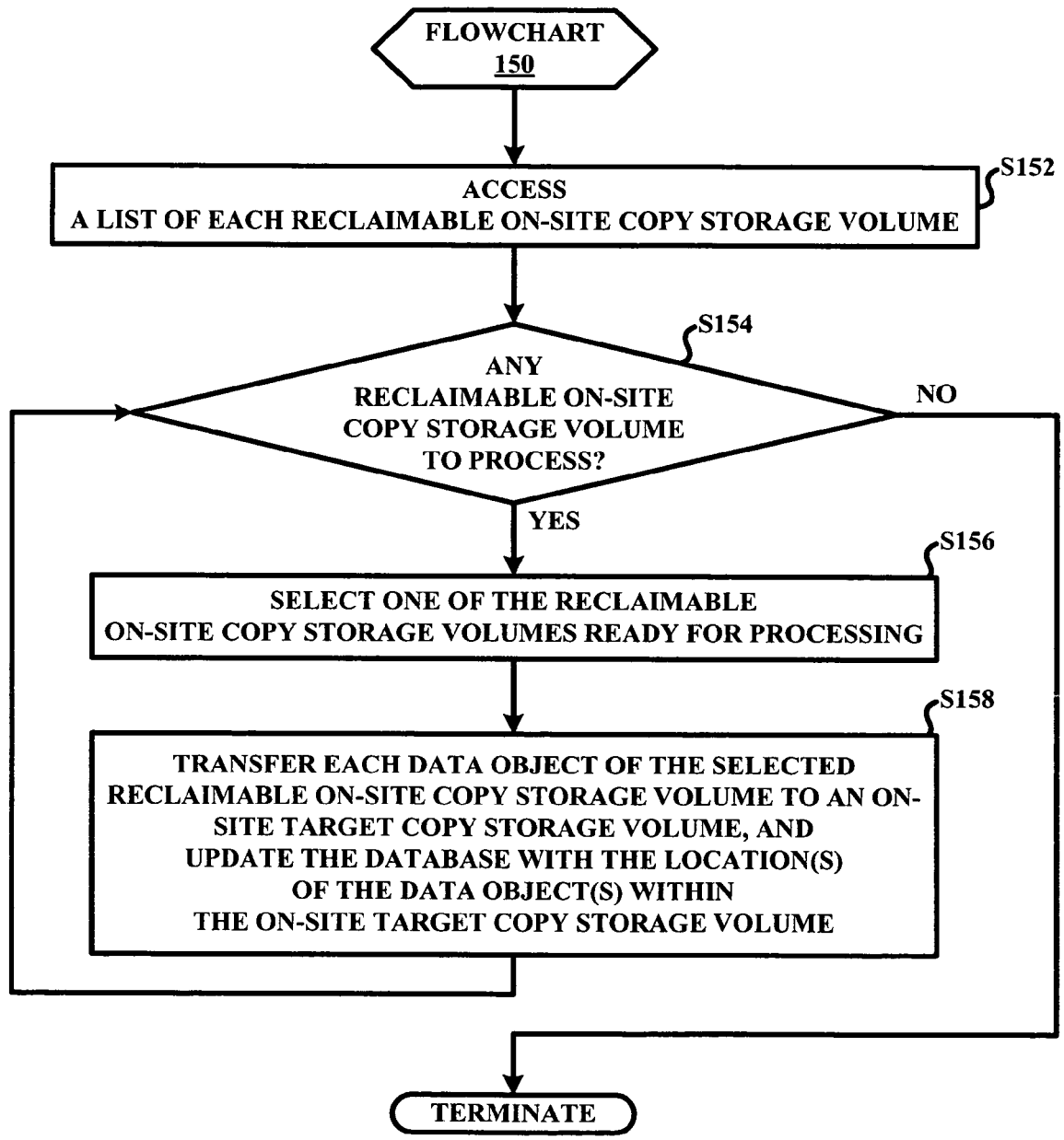
FIG. 8 illustrates a flowchart representative of one embodiment of an on-site copy storage volume transfer method in accordance with the present invention.
Figure 9:
FIG. 9 illustrates an exemplary execution of the flowchart illustrated in FIG. 8.
Figure 9:
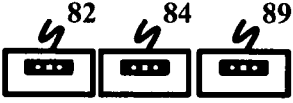
Figure 9:
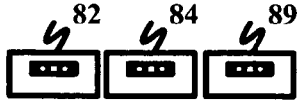
Figure 9:
Figure 9:
Figure 9:
Figure 9:
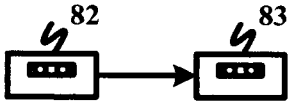
Figure 9:
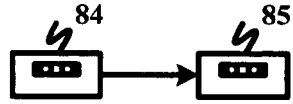
Figure 9:
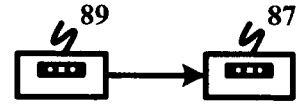

FIG. 8 illustrates a flowchart 150 as one embodiment of stage S106 (FIG. 3). Each thread of agent 41 independently implements flowchart 150 upon terminating flowchart 140 (FIG. 6). Referring to FIGS. 2 and 8, each thread of agent 41 is configured during a stage S152 of flowchart 150 to access a list of each reclaimable on-site copy storage volume among copy storage volumes 81-89. In practice, the manner by which a thread of agent 41 implements stage S152 is without limit. In one embodiment of stage S152, each thread of agent 41 accesses a list resulting from a query of database 31 (FIG. 1) during stage S102 of flowchart 100 (FIG. 3) for each on-site copy storage volume among copy storage volumes 81-89 deemed reclaimable in accordance with a conventional policy associated with server 30 (FIG. 1). FIG. 9 illustrates an example of stage S152 where on-site copy storage volumes 82, 84 and 89 are listed as being reclaimable in accordance with the conventional policy of server 30.

Referring again to FIGS. 2 and 8, each thread of agent 41 is configured during a stage S154 of flowchart 150 to terminate flowchart 150 if none of the on-site copy storage volumes among copy storage volumes 81-89 is listed as being reclaimable or if all of the listed on-site copy storage volumes among copy storage volumes 81-89 have been processed by one of the threads of agent 41 or are being processed by other threads of agent 41. If any listed on-site copy storage volume among copy storage volumes 81-89 has not been processed by one of the threads of agent 41 or is not being processed by another thread of agent 41, then each thread of agent 41 is configured during a stage S156 of flowchart 150 to select one of the listed on-site copy storage volumes among copy storage volumes 81-89. FIG. 9 illustrates an example of stage S156 where listed on-site copy storage volume 82 is selected by the first thread, listed on-site copy storage volume 84 is selected by the second thread, and listed on-site copy storage volume 89 is selected by the third thread.

Referring again to FIGS. 2 and 8, each thread of agent 41 is configured during a stage S158 of flowchart 150 to transfer each data object of the selected on-site copy storage volume to the on-site target copy storage volume among copy storage volumes 81-89 and update database 31 with the locations of the transferred data object(s) within the on-site target copy storage volume. FIG. 9 illustrates an example of stage S158 where (1) the first thread transfers the data object(s) within on-site copy storage volume 82 to on-site target copy storage volume 83, (2) the second thread transfers the data object(s) within on-site copy storage volume 84 to on-site target copy storage volume 85, and (3) the third thread transfers the data object(s) within on-site copy storage volume 89 to on-site target copy storage volume 87.

Referring again to FIGS. 2 and 8, a thread of agent 41 will return to stage S154 upon completing stage S158 to thereby terminate flowchart 150 if there are no more listed reclaimable on-site copy storage volumes among copy storage volumes 81-89, or if all of the listed reclaimable on-site copy storage volumes among copy storage volumes 81-89 have been processed by one of the threads of agent 41 or are being processed by other threads of agent 41. Otherwise, the thread will re-implement stage S156 and S158. FIG. 9 illustrates an example where all three threads terminate flowchart 150 upon returning to stage S154 in view of the fact that there are no more listed reclaimable on-site copy storage volumes among copy storage volumes 81-89.

From the preceding description of FIGS. 1-9, those having ordinary skill in the art will appreciate numerous advantages of the present invention. Foremost among such advantages is the maximum parallelism achieved at an on-site location by independent running threads to collectively reclaim reclaimable copy storage volumes. Those having ordinary skill in the art will further appreciate that, in practice, an on-site reclamation of reclaimable copy storage volumes in accordance with the present invention may be implemented as a one-pass comprehensive on-site reclamation of the reclaimable copy storage volume(s) or may be implemented in multiple iterations until a comprehensive on-site reclamation of the reclaimable copy storage volume(s) is achieved.

In one practical embodiment, agent 41 (FIG. 1) is embodied in a software module integrated with a commercially available software application entitled "IBM Tivoli Storage Manager". As such, agent 41 is installed within a memory of server 30 (FIG. 1) or distributed among various server memories whereby the server processor(s) can execute agent 41 to perform various operations of the present invention as exemplary illustrated in FIGS. 2-9. Agent 41 when embodied as a software module can be written in any conventional programming language by those having ordinary skill in the art appreciating the description herein of FIGS. 1-9.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A computer usable storage medium tangibly embodying a program of machine-readable instructions executable by at least one processor to perform operations to facilitate an on-site reclamation of at least one reclaimable copy storage volume, the operations comprising:
   identifying a plurality of reclaimable off-site copy storage volumes;
   independently running a first thread of a plurality of threads to select a first reclaimable off-site copy storage volume of the plurality of reclaimable off-site copy storage-volumes and independently running a second thread of the plurality of threads to select a second reclaimable off-site copy storage volume of the plurality of reclaimable off-site copy storage-volumes;
   running the first thread and the second thread to collectively identify each data object of the first and the second reclaimable off-site copy storage volumes that is stored within at least one random-access primary storage volume and at least one sequential-access primary storage volume;
   running the first thread to collectively copy each data object of the first reclaimable off-site copy storage volume that is stored within the at least one random-access primary storage volume to a first on-site target copy storage volume and running the second thread to collectively copy each data object of the second reclaimable off-site copy storage volume that is stored within the least one random-access primary storage volume to a second on-site target copy storage volume;
   running the first thread and the second thread to collectively queue each identified sequential-access primary storage volume into a common queue shared by the first thread and the second thread;
   running the first thread and the second thread to collectively queue each identified data object on each queued sequential-access primary storage volume;
   running the first thread to collectively copy the queued identified data objects of the first reclaimable off-site copy storage volume from the queued at least one sequential-access primary storage volume to the first on-site target copy storage volume and running the second thread to collectively copy the queued identified data objects of the second reclaimable off-site copy storage volume from the queued at least one sequential-access primary storage volume to the second on-site target copy storage volume; and
   updating a database with locations of the data objects of the plurality of reclaimable off-site copy storage volumes within the target copy storage volume.

2. The medium of claim 1, further comprising running the first and second threads to collectively identify each sequential-access primary storage volume that stores at least one data object stored within the first and second reclaimable off-site copy storage volumes.

3. The medium of claim 1, wherein the first thread completes collectively copying one or more data objects from the at least one random-access primary storage volume and proceeds to collectively copying one or more data objects from the least one sequential-access primary storage volume independent of the second thread completing collectively copying one or more data objects from the at least one random access primary storage volume.

4. The medium of claim 1, further comprising:
   identifying at least one reclaimable on-site copy storage volume; and
   running a plurality of threads to collectively transfer each data object of the at least one reclaimable on-site copy storage volume to at least one on-site target copy storage volumes.

5. The medium of claim 4, wherein running the plurality of threads to collectively transfer each data object of the at least one reclaimable on-site copy storage volume to the at least one on-site target copy storage volume includes:
   independently running the first thread to select one of the at least one reclaimable on-site copy storage volume; and
   independently running the first thread to transfer each data object from the selected reclaimable on-site copy storage volume to the first on-site target copy storage volume.

6. A system, comprising:
   at least one processor; and
   at least one memory storing instructions operable with the at least one processor for facilitating an on-site reclamation of at least one reclaimable copy storage volume, the instructions being executed for:
   identifying a plurality of reclaimable off-site copy storage volumes;
   independently running a first thread of a plurality of threads to select a first reclaimable off-site copy storage volume of the plurality of reclaimable off-site copy storage-volumes and independently running a second thread of the plurality of threads to select a second reclaimable off-site copy storage volume of the plurality of reclaimable off-site copy storage-volumes;
   running the first thread and the second thread to collectively identify each data object of the first and the second reclaimable off-site copy storage volumes that is stored within at least one random-access primary storage volume and at least one sequential-access primary storage volume;
   running the first thread to collectively copy each data object of the first reclaimable off-site copy storage volume that is stored within the at least one random-access primary storage volume to a first on-site target copy storage volume and running the second thread to collectively copy each data object of the second reclaimable off-site copy storage volume that is stored within the least one random-access primary storage volume to a second on-site target copy storage volume;
   running the first thread and the second thread to collectively queue each identified sequential-access primary storage volume into a common queue shared by the first thread and the second thread;
   running the first thread and the second thread to collectively queue each identified data object on each queued sequential-access primary storage volume;

running the first thread to collectively copy the queued identified data objects of the first reclaimable off-site copy storage volume from the queued at least one sequential-access primary storage volume to the first on-site target copy storage volume and running the second thread to collectively copy the queued identified data objects of the second reclaimable off-site copy storage volume from the queued at least one sequential-access primary storage volume to the second on-site target copy storage volume; and updating a database with locations of the data objects of the plurality of reclaimable off-site copy storage volumes within the target copy storage volume.

7. The system of claim 6, further comprising running the first and second threads to collectively identify each sequential-access primary storage volume that stores at least one data object stored within the first and second reclaimable off-site copy storage volumes.

8. The system of claim 6, wherein the first thread completes collectively copying one or more data objects from the at least one random-access primary storage volume and proceeds to collectively copying one or more data objects from the least one sequential-access primary storage volume independent of the second thread completing collectively copying one or more data objects from the at least one random-access primary storage volume.

9. The system of claim 6, further comprising:
identifying at least one reclaimable on-site copy storage volume; and
running a plurality of threads to collectively transfer each data object of the at least one reclaimable on-site copy storage volume to at least one on-site target copy storage volume.

10. The system of claim 9, wherein running the plurality of threads to collectively transfer each data object of the at least one reclaimable on-site copy storage volume to the at least one on-site target copy storage volume includes:
independently running the first thread to select one of the at least one reclaimable on-site copy storage volume; and
independently running the first thread to transfer each data object from the selected reclaimable on-site copy storage volume to the first on-site target copy storage volume.

11. A server for facilitating an on-site reclamation of at least one reclaimable off-site copy storage volume, the server comprising:
means for identifying a plurality of reclaimable off-site copy storage volumes; and
means for independently running a first thread of a plurality of threads to select a first reclaimable off-site copy storage volume of the plurality of reclaimable off-site copy storage-volumes and independently running a second thread of the plurality of threads to select a second reclaimable off-site copy storage volume of the plurality of reclaimable off-site copy storage-volumes;
means for running the first thread and the second thread to collectively identify each data object of the first and the second reclaimable off-site copy storage volumes that is stored within at least one random-access primary storage volume and at least one sequential-access primary storage volume;
means for running the first thread to collectively copy each data object of the first reclaimable off-site copy storage volume that is stored within the at least one random-access primary storage volume to a first on-site target copy storage volume and running the second thread to collectively copy each data object of the second reclaimable off-site copy storage volume that is stored within the least one random-access primary storage volume to a second on-site target copy storage volume;
means for running the first thread and the second thread to collectively queue each identified sequential-access primary storage volume into a common queue shared by the first thread and the second thread;
means for running the first thread and the second thread to collectively queue each identified data object on each queued sequential-access primary storage volume;
means for running the first thread to collectively copy the queued identified data objects of the first reclaimable off-site copy storage volume from the queued at least one sequential-access primary storage volume to the first on-site target copy storage volume and running the second thread to collectively copy the queued identified data objects of the second reclaimable off-site copy storage volume from the queued at least one sequential-access primary storage volume to the second on-site target copy storage volume; and
means for updating a database with locations of the data objects of the plurality of reclaimable off-site copy storage volumes within the target copy storage volume.

12. The server of claim 11, further comprising:
means for identifying at least one reclaimable on-site copy storage volume; and
means for running a plurality of threads to collectively transfer each data object of the at least one reclaimable on-site copy storage volume to at least one on-site target copy storage volume.

13. The server of claim 11, wherein the first thread completes collectively copying one or more data objects from the at least one random-access primary storage volume and proceeds to collectively copying one or more data objects from the least one sequential-access primary storage volume independent of the second thread completing collectively copying one or more data objects from the at least one random-access primary storage volume.

14. A method for facilitating an on-site reclamation of at least one reclaimable copy storage volume, the method comprising:
identifying a plurality of reclaimable off-site copy storage volumes;
independently running a first thread of a plurality of threads to select a first reclaimable off-site copy storage volume of the plurality of reclaimable off-site copy storage-volumes and independently running a second thread of the plurality of threads to select a second reclaimable off-site copy storage volume of the plurality of reclaimable off-site copy storage-volumes;
running the first thread and the second thread to collectively identify each data object of the first and the second reclaimable off-site copy storage volumes that is stored within at least one random-access primary storage volume and at least one sequential-access primary storage volume;
running the first thread to collectively copy each data object of the first reclaimable off-site copy storage volume that is stored within the at least one random-access primary storage volume to a first on-site target copy storage volume and running the second thread to collectively copy each data object of the second reclaimable off-site copy storage volume that is stored within the least one random-access primary storage volume to a second on-site target copy storage volume;
running the first thread and the second thread to collectively queue each identified sequential-access primary storage volume into a common queue shared by the first thread and the second thread;

running the first thread and the second thread to collectively queue each identified data object on each queued sequential-access primary storage volume;

running the first thread to collectively copy the queued identified data objects of the first reclaimable off-site storage volume from the queued at least one sequential-access primary storage volume to the first on-site target copy storage volume and running the second thread to collectively copy the queued identified data objects of the second reclaimable off-site storage volume from the queued at least one sequential-access primary storage volume to the second on-site target copy storage volume; and updating a database with locations of the data objects of the plurality of reclaimable off-site copy storage volumes within the target copy storage volume.

15. The method of claim 14, further comprising:

identifying at least one reclaimable on-site copy storage volume; and running a plurality of threads to collectively transfer each data object of the at least one reclaimable on-site copy storage volume to at least one on-site target copy storage volume.

16. The method of claim 15, wherein running the plurality of threads to collectively transfer each data object of the at least one reclaimable on-site copy storage volume to the at least one on-site target copy storage volume includes:

independently running the first thread to select one of the at least one reclaimable on-site copy storage volume; and independently running the first thread to transfer each data object from the selected reclaimable on-site copy storage volume to the first on-site target copy storage volume.

17. The method of claim 14, wherein the first thread completes collectively copying one or more data objects from the at least one random-access primary storage volume and proceeds to collectively copying one or more data objects from the least one sequential-access primary storage volume independent of the second thread completing collectively copying one or more data objects from the at least one random-access primary storage volume.

* * * * *